(12) United States Patent
Zhang et al.

(10) Patent No.: US 10,572,647 B2
(45) Date of Patent: *Feb. 25, 2020

(54) TOUCHSCREEN UNLOCKING METHOD AND APPARATUS

(71) Applicant: TENCENT TECHNOLOGY (SHENZHEN) COMPANY LIMITED, Shenzhen (CN)

(72) Inventors: Jing Zhang, Shenzhen (CN); Neng Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,534

(22) Filed: Aug. 28, 2017

(65) Prior Publication Data

US 2017/0357796 A1 Dec. 14, 2017

Related U.S. Application Data

(63) Continuation of application No. 14/733,811, filed on Jun. 8, 2015, now Pat. No. 9,779,228, which is a (Continued)

(30) Foreign Application Priority Data

Dec. 7, 2012 (CN) .......................... 2012 1 0524804

(51) Int. Cl.
*G06F 21/00* (2013.01)
*G06F 21/36* (2013.01)
(Continued)

(52) U.S. Cl.
CPC .......... *G06F 21/36* (2013.01); *G06F 3/04842* (2013.01); *G06F 3/04845* (2013.01);
(Continued)

(58) Field of Classification Search
CPC .. G06F 21/36; G06F 3/04847; G06F 3/04842; G06F 3/04845; G06F 21/00
See application file for complete search history.

(56) References Cited

U.S. PATENT DOCUMENTS

2010/0269040 A1* 10/2010 Lee ..................... G06F 3/04817
715/702
2011/0283241 A1* 11/2011 Miller ................. G06F 3/04883
715/863
(Continued)

FOREIGN PATENT DOCUMENTS

CN 101706707 A 5/2010
CN 101763284 A 6/2010
(Continued)

*Primary Examiner* — Jeffrey C Pwu
*Assistant Examiner* — Helai Salehi
(74) *Attorney, Agent, or Firm* — Anova Law Group, PLLC

(57) ABSTRACT

A touchscreen unlocking method and apparatus are disclosed. The method includes receiving an unlocking instruction triggered by a user by sliding a control on a touchscreen; reading a corresponding user-defined screen locking configuration file according to the unlocking instruction; and performing an unlocking operation on the touchscreen according to the corresponding user-defined screen locking configuration file. In the present disclosure, when a user triggers unlocking, an unlocking operation is performed on a touchscreen according to a user-defined screen locking configuration file; and an unlocking control on the touchscreen can be self-defined and randomly set by the user, and different effects such as animation, sound, and vibration may be displayed in different states, thereby greatly improving unlocking convenience and fun, and meeting the requirement that the user hopes to self-define an unlocking manner according to the preference of the user.

20 Claims, 3 Drawing Sheets

Related U.S. Application Data continuation of application No. PCT/CN2013/085707, filed on Oct. 20, 2013.

(51) Int. Cl.
  *H04M 1/67* (2006.01)
  *G06F 3/0488* (2013.01)
  *G06F 3/0484* (2013.01)

(52) U.S. Cl.
  CPC ...... *G06F 3/04847* (2013.01); *G06F 3/04883* (2013.01); *H04M 1/67* (2013.01)

(56) References Cited

U.S. PATENT DOCUMENTS

| | | | | |
|---|---|---|---|---|
| 2013/0094770 A1* | 4/2013 | Lee | ............... | G06F 21/36 |
| | | | | 382/218 |
| 2014/0325195 A1* | 10/2014 | Xu | ............... | H04M 1/67 |
| | | | | 713/1 |

FOREIGN PATENT DOCUMENTS

| CN | 102075619 A | 5/2011 |
|---|---|---|
| CN | 102236527 A | 11/2011 |
| CN | 102779012 A | 11/2012 |

* cited by examiner

TOUCHSCREEN UNLOCKING METHOD AND APPARATUS

CROSS-REFERENCES TO RELATED APPLICATIONS

This application is a continuation application of U.S. patent application Ser. No. 14/733,811, filed on Jun. 8, 2015. U.S. patent application Ser. No. 14/733,811 is a continuation application of PCT patent application no. PCT/CN2013/085707, filed on Oct. 20, 2013, which claims priority to Chinese Patent Application No. 201210524804.2, filed with the Chinese Patent Office on Dec. 7, 2012 and entitled "TOUCHSCREEN UNLOCKING METHOD AND APPARATUS", the content of all of which is incorporated by reference in its entirety.

FIELD OF THE TECHNOLOGY

The present disclosure generally relates to the field of Internet and touch-control apparatus technologies and, in particular, to a touchscreen unlocking method and apparatus.

BACKGROUND OF THE DISCLOSURE

Currently, a touchscreen locking technology is often used on a mobile phone terminal to prevent mis-operation on the display of the mobile phone in a standby state. A user needs to unlock the mobile phone by using a specific touch path or button before entering an operation interface.

As resources on the Internet grow, and the number of users on the Android platform increases, a user has an increasingly strong demand for a product with a user-defined unlocking interface and unlocking manner. Every user hopes to have a preferred unlocking manner. Currently, a commonly used unlocking manner is: providing some options for the user to change a background picture, or to change a position of a slider. However, such unlocking manner cannot meet the user's requirement for self-defining an unlocking manner according to a preference of the user. How to simply extract core elements of screen locking so that the user can self-define screen locking to the greatest extent becomes a difficult technical problem.

SUMMARY

An objective of the present disclosure is to provide a touchscreen unlocking method and apparatus that can allow a user to self-define a screen locking interface and perform unlocking freely to a maximum degree.

Therefore, one aspect of the present disclosure provides a touchscreen unlocking method. The touchscreen unlocking method includes: receiving an unlocking instruction triggered by a user by sliding a control on a touchscreen; reading a corresponding user-defined screen locking configuration file according to the unlocking instruction; and performing an unlocking operation on the touchscreen according to the corresponding user-defined screen locking configuration file.

Another aspect of the present disclosure further provides a touchscreen unlocking apparatus. The touchscreen unlocking apparatus includes an instruction receiving unit, a file reading unit, and an unlocking operation unit. The instruction receiving unit is configured to receive an unlocking instruction triggered by a user by sliding a control on a touchscreen; the file reading unit is configured to read a corresponding user-defined screen locking configuration file according to the unlocking instruction; and the unlocking operation unit is configured to perform an unlocking operation on the touchscreen according to the corresponding user-defined screen locking configuration file.

Another aspect of the present disclosure further provides a non-transitory computer-readable medium having computer program for, when being executed by a processor, performing a touchscreen unlocking method. The method includes receiving an unlocking instruction triggered by a user by sliding a control on a touchscreen; reading a corresponding user-defined screen locking configuration file according to the unlocking instruction; and performing an unlocking operation on the touchscreen according to the corresponding user-defined screen locking configuration file.

With the touchscreen unlocking method and apparatus that are provided according to the foregoing aspects of the present disclosure, when a user triggers unlocking, an unlocking operation is performed on a touchscreen according to a user-defined screen locking configuration file; an unlocking control on the touchscreen can be defined by the user and randomly set, and different effects such as an animation, a sound, and a vibration can be displayed in different states, thereby greatly improving unlocking convenience and fun, and meeting the requirement that the user hopes to self-define an unlocking manner according to the preference of the user.

To make technical solutions of the present disclosure clearer and more perspicuous, the following provides detailed description with reference to the accompanying drawings.

DESCRIPTION OF EMBODIMENTS

According to embodiments of the present disclosure, a user defines a screen locking interface to generate a screen locking configuration file. When the user triggers unlocking, an unlocking operation is performed on a touchscreen according to the user-defined screen locking configuration file. An unlocking control on the touchscreen can be defined by the user and randomly set, and different effects, such as animation, sound, and vibration, can be displayed in different states, thereby greatly improving convenience and fun for unlocking screens, and meeting the requirement that the user hopes to self-define an unlocking manner according to the user's preference.

Figure 1:
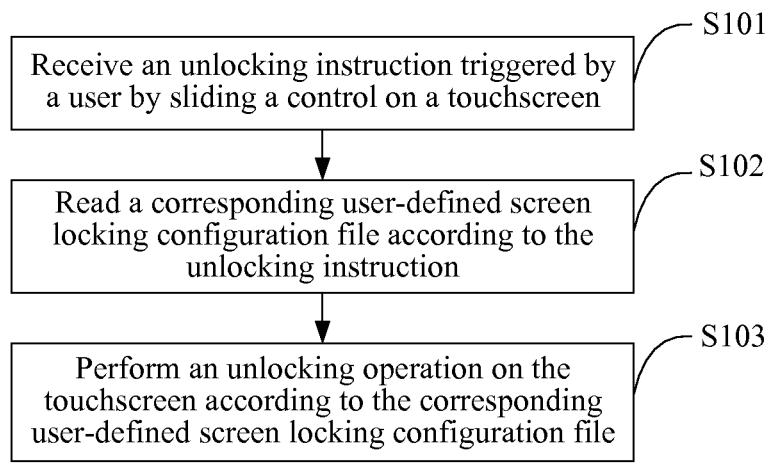
FIG. 1 illustrates a flowchart of a first embodiment of a touchscreen unlocking method according to the present disclosure.

As shown in FIG. 1, a first embodiment of the present disclosure provides a touchscreen unlocking method. The method includes the following steps.

Step S101: Receiving an unlocking instruction triggered by a user by sliding a control on a touchscreen.

Step S102: Reading a corresponding user-defined screen locking configuration file according to the unlocking instruction.

A system to which the touchscreen unlocking solution in this embodiment is applicable includes, but is not limited to, an Android operating system. In this embodiment, description is provided by using the Android operating system as an example. The touchscreen apparatus in this embodiment includes, but is not limited to, a mobile phone, a tablet computer, a personal computer, a PDA, and the like.

Common desktop software is installed on the Internet-based touchscreen apparatus, which provides common desktop functions such as screen management and application program management. In this embodiment, the user can self-define a screen locking interface freely to a maximum degree, implementing user-defined unlocking of the touchscreen apparatus.

Figure 2:
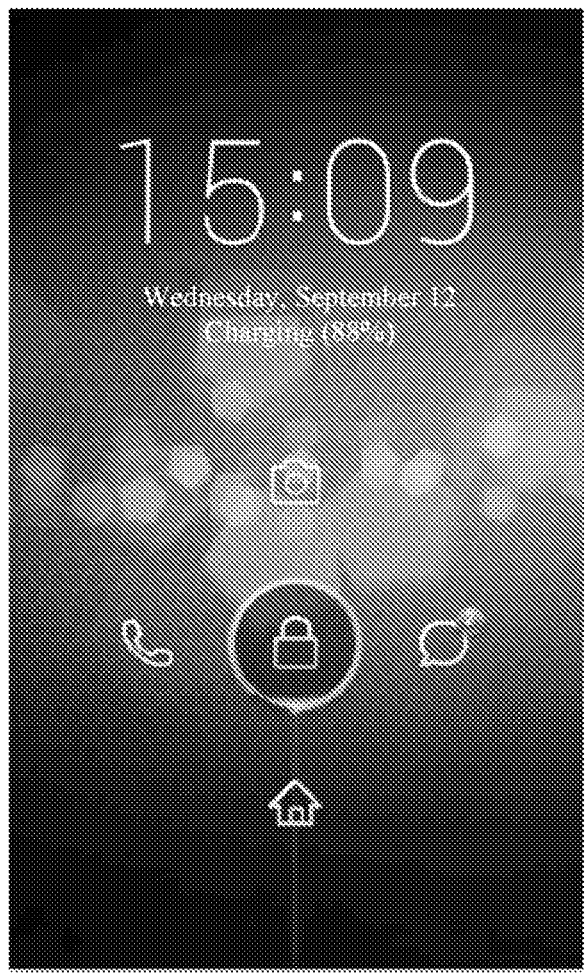
FIG. 2 illustrates a user-defined screen locking interface of a touchscreen according to the present disclosure.

The user may define any icon display on a touchscreen desktop in advance according to a preference or need of the user, where content of each icon display is treated as a single control, and the touchscreen apparatus displays a corresponding screen locking interface on the touchscreen desktop according to user settings. As shown in FIG. 2, FIG. 2 shows a user-defined screen locking interface of a touchscreen on a mobile phone QQ desktop, which includes the following controls: unlocking target controls such as a time and date display, a charging display, an unlocking button, a main menu, a call, a camera, and WeChat. In an actual screen locking interface, the controls arc not limited to the foregoing several controls.

In addition, the user may further self-define a specific unlocking manner based on the controls on the screen locking interface. The setting information, such as the user-defined setting made by the user for the screen locking interface and a corresponding unlocking manner, is pre-stored in the touchscreen apparatus as a screen locking configuration file. Further, subsequently corresponding unlocking operation may be performed according to the screen locking configuration file.

The QQ desktop shown in FIG. 2 is used as an example. The mobile phone may display the corresponding screen locking interface by reading the user-defined screen locking configuration file, and may perform unlocking in a specific manner.

The screen locking configuration file includes an unlocking manner of each control and attribute information of the control. The attribute information of the control may include: coordinates of the control on the screen, a touchable area of the control, a target area, and the like.

Specifically, the screen locking configuration file may include two types of files: an interface layout file and a resource file, where the interface layout file is stored in an 'xml' format; and the resource file is placed under a 'res' directory, including files such as picture, sound, and font.

In a specific implementation, as an embodiment, a control on the screen locking interface is displayed by default on a 480*800 canvas, and a desktop of the touchscreen apparatus may automatically make adaptation according to a model of the touchscreen apparatus.

The screen locking configuration file may record the following information about the control:

1. Each control has its own specific name, which is described as name="", for example, name="time" is a valid description.

In addition, each control may have four different states, which are specifically as follows:

a. normal: indicating a state in which the user has not performed any operation;

b. press: indicating a state in which the user touches the screen;

c. unlock: indicating an unlocking success state, which is used to display a specific unlocking effect after the user achieves an unlocking objective; and d. unlock-fail: indicating an unlocking failure state, which is displayed when the user slides a control and releases the finger but fails unlocking the screen.

In different states, each control may have a different image, animation, sound, and even different coordinates. Generally, it is not recommended to reset the coordinates, because an additional control may be defined to achieve the objective.

2. The control has its own coordinates x+dx and y+dy with the upper left corner as the origin, where dx and dy are displacement modification values. The displacement value may be written as a name of a reference control, indicating that it is proportional to or inversely proportional to a displacement of the reference control. Thus, a displacement can be implemented in a case of a touch. For example, x=50+dx/3, y=80+time/2 is a valid description (this information is mandatory).

3. The control has a specific image, animation, sound, text, and font for display, where a font size and whether to vibrate are directed to a 'res' file directory by using a resource file; and the animation is described in a standard manner supported by Android. For example, icon="tcst.png" ani="a.xml" voice="b.wav" text="It is very fine today"; and Size="18" font="c.ttf" vibrate="true" is a valid description.

4. If the control is touchable, there are a touchable area 'pressrect' and a target area 'destrect', where the touchable area 'pressrect' is a mandatory option, and is used to confirm a response area of the control; and the target area 'destrect' is a non-mandatory option, and if the user only requires the control to have a touch response and does not require it to be used for unlocking, the user might not set the target area 'destrect'.

For example, a common scenario is that, there is an animal icon on the screen locking interface, and when the icon is tapped, a sound is produced or an animation is played; however the animal icon is not used for unlocking.

If a control is set as a control for unlocking, the target area 'destrect' is a mandatory option. There may be multiple target areas, and the description may be a specific coordinate area or may be a corresponding control name. When the control reaches the target area, and the user releases the finger, all controls are set to the unlocking success state, and the corresponding animation and sound may be played or a vibration is generated. Otherwise, if the sliding control does not reach the target area after the user releases the finger, the animation, sound, and the like corresponding to the unlocking failure are played.

5. The control may be set as to whether to be hidden in different states.

6. A program to be started after the control is unlocked, where a description may be written under the control to specify a desktop program that is to be started by default after the control is unlocked. The description may be written under a mobile control, or may also be written under a non-mobile control. When the description is written under a mobile control, a corresponding program is enabled or started after the control is moved to perform unlocking successfully; and when the description is written under a non-mobile control, if an area in which the user releases the finger when performing unlocking is within the non-mobile control, a program corresponding to the non-mobile control is enabled.

7. If the control is indicated as a charging-state display control, and some states of the charging-state display control need to be changed according to a charging percentage, where the charging percentage is named 'chargeper'. For example, x=60+chargeper*100 means that the x coordinate moves to the right by 1 each time the electricity amount increases by 1%.

8. If the control is indicated as a time-and-date display control, a standard 'fromat' format needs to be provided to format a system time to be displayed in a corresponding format.

9. An extended parameter, which can change the corresponding image, animation, and sound according to a direction sensor, an acceleration sensor, and the like on the touchscreen apparatus.

The controls may have all the control information listed in the foregoing items 2 to 9, and does not necessarily have the same information.

When unlocking is needed, the user slides a corresponding control on the touchscreen to trigger an unlocking operation. The screen locking interface shown in FIG. 2 is used as an example. If a control other than an unlocking button on the screen locking interface is set as a target control, the unlocking instruction triggered by the user by sliding the control on the touchscreen may be an unlocking instruction triggered by the user by sliding the unlocking button to the target control on the touchscreen, or may be an unlocking instruction triggered by the user by sliding the target control to the unlocking button on the touchscreen.

The touchscreen apparatus reads the corresponding user-defined screen locking configuration file after receiving the unlocking instruction triggered by the user.

Step S103: Performing an unlocking operation on the touchscreen according to the corresponding user-defined screen locking configuration file.

The screen locking interface shown in FIG. 2 is used as an example. When the user sliding manner is sliding from the unlocking button to the target control, a process in which the touchscreen apparatus performs an unlocking operation on the touchscreen according to the corresponding user-defined screen locking configuration file is as follows: whether the unlocking button moves to an area in which the target control is located is first determined; and if the unlocking button does not move to the area in which the target control is located, it indicates that the unlocking fails, and an animation and/or a sound corresponding to an unlocking failure is played. If the unlocking button moves to the area in which the target control is located, it indicates that the unlocking succeeds, and a corresponding unlocking interface is displayed or a corresponding application interface is entered in an unlocking manner in a screen locking configuration file corresponding to the target control and, at the same time, a corresponding animation and sound may further be played, or a vibration may be generated, where all or some unlocking effects of the animation, the sound, and the vibration may be configured.

Alternatively, when the user sliding manner is sliding from the target control to the unlocking button, a process in which the touchscreen apparatus performs an unlocking operation on the touchscreen according to the corresponding user-defined screen locking configuration file is as follows: whether the target control moves to a target area in which the unlocking button is located is first determined; and if the target control does not move to the target area in which the unlocking button is located, it indicates that the unlocking fails, and an animation and/or a sound corresponding to an unlocking failure is played. If the target control moves to the target area in which the unlocking button is located, it indicates that the unlocking succeeds, and a corresponding unlocking interface is displayed or a corresponding application interface is entered in an unlocking manner in a screen locking configuration file corresponding to the target control. At the same time, a corresponding animation and sound may further be played, or a vibration may be generated.

In this embodiment, the foregoing solution enables a user to self-define a screen locking interface and a corresponding control unlocking manner according to a requirement, and a control may display different effects such as an animation, a sound, and a vibration in different states, thereby greatly improving unlocking convenience and fun, and meeting the requirement that the user hopes to self-define an unlocking manner according to the preference of the user.

Figure 3:
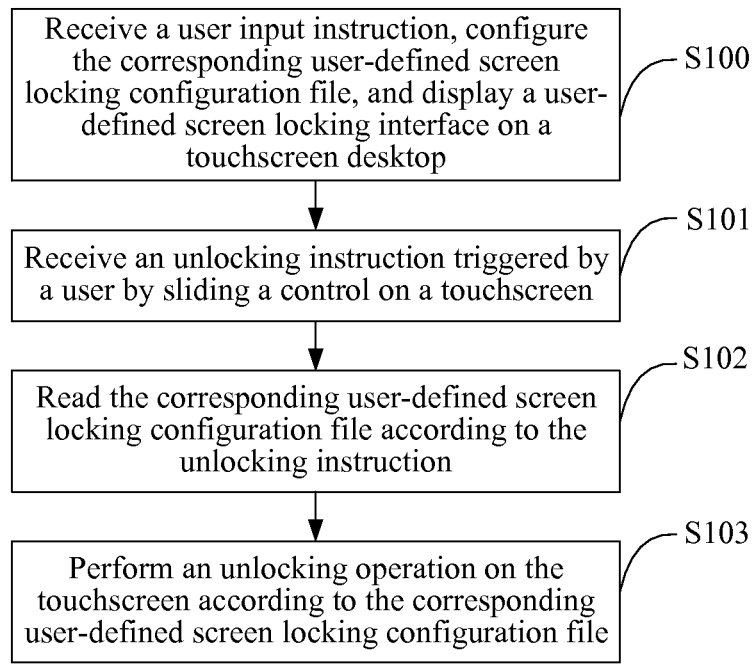
FIG. 3 illustrates a flowchart of a second embodiment of a touchscreen unlocking method according to the present disclosure.

As shown in FIG. 3, a second embodiment of the present disclosure provides a touchscreen unlocking method. On the basis of the first embodiment, before step S101 of receiving an unlocking instruction triggered by a user by sliding a control on a touchscreen, the method further includes the followings.

Step S100: Receiving a user input instruction, configuring the corresponding user-defined screen locking configuration file, and displaying a user-defined screen locking interface on a touchscreen desktop.

A difference between this embodiment and the first embodiment may be that, this embodiment further includes a solution in which the user self-defines and configures the screen locking configuration file and a touchscreen apparatus displays the user-defined screen locking interface on the touchscreen desktop.

Specifically, the touchscreen apparatus may provide a setting option for the user to select for input, and to self-define icons of touchable controls that the user hopes to be displayed on a desktop of the touchscreen apparatus, including a control for unlocking, thereby forming a user-defined screen locking desktop.

The user may self-define any icon display on the touchscreen desktop, where content of each icon display is treated as a single control, and the touchscreen apparatus displays a corresponding screen locking interface on a touchscreen desktop according to user settings. As shown in FIG. 2, FIG. 2 is a user-defined screen locking interface of a touchscreen on a mobile phone QQ desktop, which includes the following controls: unlocking target controls such as a time and date display, a charging display, an unlocking button, a main menu, a call, a camera, and WeChat. In an actual screen locking interface, the controls are not limited to the foregoing several controls.

In addition, the user may further self-define a specific unlocking manner based on the controls on the screen locking interface. The setting information such as the user-defined setting made by the user for the screen locking interface and a corresponding unlocking manner are stored in the touchscreen apparatus as a screen locking configuration file, and subsequently corresponding unlocking operation may be performed according to the screen locking configuration file.

In this embodiment, a user-defined configuration of a screen locking configuration file can be implemented on a touchscreen apparatus. On a touchscreen desktop, there may be any number of touchable controls and any number of unlocking area controls, thereby greatly improving unlocking convenience and fun.

The touchable control does not have to be used as an unlocking control, and may be simply used for entertainment (when the control is taped, a sound is generated, an animation is played, or the like), or for improving look of an interface (for example, tapping a time to switch to a date, or tapping an icon to display a time; however, the time and date are not displayed in a normal state so as to prevent impacting on the entire look of the interface).

In addition, any control may have effects such as an animation, a sound, and a vibration, and may display different effects in different states. In this embodiment, the unlocking effects of the control may be further compatible with most unlocking effects, and the user may freely configure a needed unlocking effect. In addition, an extended parameter may help the user create some "cool and dazzling" special effects.

Figure 4:
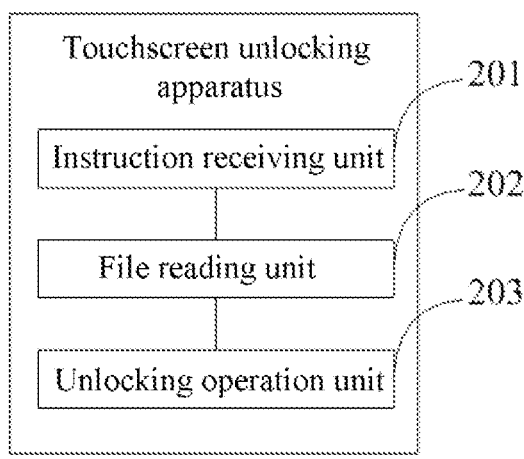
FIG. 4 illustrates a schematic structural diagram of a first embodiment of a touchscreen unlocking apparatus according to the present disclosure.

As shown in FIG. 4, a structure of a first embodiment of a touchscreen unlocking apparatus is provided in the present disclosure. The touchscreen unlocking apparatus includes: an instruction receiving unit 201, a file reading unit 202, and an unlocking operation unit 203. The instruction receiving unit 201 is configured to receive an unlocking instruction triggered by a user by sliding a control on a touchscreen; the file reading unit 202 is configured to read a corresponding user-defined screen locking configuration file according to the unlocking instruction; and the unlocking operation unit 203 is configured to perform an unlocking operation on the touchscreen according to the corresponding user-defined screen locking configuration file.

A touchscreen apparatus in this embodiment may be a touchscreen terminal, and a system to which the touchscreen unlocking solution is applicable includes, but is not limited to, an Android operating system. In this embodiment, description is provided by using the Android operating system as an example. The touchscreen apparatus in this embodiment includes, but is not limited to, a mobile phone (mobile phone), a tablet computer, a personal computer, a PDA, and the like.

Common desktop software is installed on the Internet-based touchscreen apparatus, which provides common desktop functions such as screen management and application program management. In this embodiment, the user can self-define a screen locking interface freely to a maximum degree, implementing user-defined unlocking of the touchscreen apparatus.

The user may define any icon display on a touchscreen desktop in advance according to a preference or need of the user, where content of each icon display is treated as a single control, and the touchscreen apparatus displays a corresponding screen locking interface on a touchscreen desktop according to user settings. As shown in FIG. 2, FIG. 2 shows a user-defined screen locking interface of a touchscreen on a mobile phone QQ desktop, which includes the following controls: unlocking target controls such as a time and date display, a charging display, an unlocking button, a main menu, a call, a camera, and WeChat. In an actual screen locking interface, the controls are not limited to the foregoing several controls.

In addition, the user may further self-define a specific unlocking manner based on the controls on the screen locking interface. The setting information such as the user-defined setting made by the user for the screen locking interface and a corresponding unlocking manner are pre-stored in the touchscreen apparatus as a screen locking configuration file. Further, corresponding unlocking operation may be performed according to the screen locking configuration file.

The QQ desktop shown in FIG. 2 is used as an example. The mobile phone may display the corresponding screen locking interface by reading the user-defined screen locking configuration file, and may perform unlocking in a specific manner.

The screen locking configuration file includes an unlocking manner of each control and attribute information of the control. The attribute information of the control may include: coordinates of the control on the screen, a touchable area of the control, a target area, and the like.

Specifically, the screen locking configuration file may include two types of files: an interface layout file and a resource file, where the interface layout file is stored in an 'xml' format; and the resource file is placed under a 'res' directory, including files such as picture, sound, and font.

In a specific implementation, as an embodiment, a control on the screen locking interface is displayed by default on a 480*800 canvas, and a desktop of the touchscreen apparatus may automatically make adaptation according to a model of the touchscreen apparatus.

The screen locking configuration file may record the following information about the control:

1. Each control has its own specific name, which is described as name=" ", for example, name="time" is a valid description.

In addition, each control may have four different states, which are specifically as follows:

a. normal: indicating a state in which the user has not performed any operation;

b. press: indicating a state in which the user touches the screen;

c. unlock: indicating an unlocking success state, which is used to display a specific unlocking effect after the user achieves an unlocking objective; and d. unlock-fail: indicating an unlocking failure state, which is displayed when the user slides a control and releases the finger but fails unlocking the screen.

In different states, each control may have a different image, animation, sound, and even different coordinates. Generally, it is not recommended to reset the coordinates, because an additional control may be defined to achieve the objective.

2. The control has its own coordinates x+dx and y+dy with the upper left corner as the origin, where dx and dy are displacement modification values. The displacement value may be written as a name of a reference control, indicating that it is proportional to or inversely proportional to a displacement of the reference control. Thus, a displacement can be implemented in a case of a touch. For example, x=50+dx/3 and y=80+time/2 is a valid description (this information is mandatory).

3. The control has a specific image, animation, sound, text, and font for display, where a font size and whether to vibrate are directed to a 'res' file directory by using a resource file; and the animation is described in a standard manner supported by Android. For example, icon="test.png" ani="a.xml" voice="b.wav" text="It is very fine today"; and Size="18" font="c.ttf" vibrate="true" is a valid description.

4. If the control is touchable, there are a touchable area 'pressrect' and a target area 'destrect', where the touchable area 'pressrect' is a mandatory option, and is used to confirm a response area of the control; and the target area 'destrect' is a non-mandatory option, and if the user only requires the control to have a touch response and does not require it to be used for unlocking, the user might not set the target area 'destrect'.

For example, a common scenario is that, there is an animal icon on the screen locking interface, and when the icon is tapped, a sound is produced or an animation is played; however the animal icon is not used for unlocking.

If a control is set as a control for unlocking, the target area 'destrect' is a mandatory option. There may be multiple target areas, and the description may be a specific coordinate area or may be a corresponding control name. When the control reaches the target area, and the user releases the finger, all controls are set to the unlocking success state, and the corresponding animation and sound may be played or a vibration is generated. Otherwise, if the sliding control does not reach the target area after the user releases the finger, the animation, sound, and the like corresponding to the unlocking failure are played.

5. The control may be set as to whether to be hidden in different states.

6. A program to be enabled or started after the control is unlocked, where a description may be written under the control to specify a desktop program that is to be enabled by default after the control is unlocked. The description may be written under a mobile control, or may also be written under a non-mobile control. When the description is written under a mobile control, a corresponding program is enabled after the control is moved to perform unlocking successfully; and when the description is written under a non-mobile control, if an area in which the user releases the finger when performing unlocking is within the non-mobile control, a program corresponding to the non-mobile control is enabled.

7. If the control is indicated as a charging-state display control, and some states of the charging-state display control need to be changed according to a charging percentage, where the charging percentage is named chargeper. For example, x=60+chargeper*100 means that the x coordinate moves to the right by 1 each time the electricity amount increases by 1%.

8. If the control is indicated as a time-and-date display control, a standard 'fromat' format needs to be provided, to format a system time to be displayed in a corresponding format.

9. An extended parameter, which can change the corresponding image, animation, and sound according to a direction sensor, an acceleration sensor, and the like on the touchscreen apparatus.

The controls may have all the control information listed in the foregoing items 2 to 9, and does not necessarily have the same information.

When unlocking is needed, the user slides a corresponding control on the touchscreen to trigger an unlocking operation. For example, on the screen locking interface shown in FIG. 2, if a control other than an unlocking button on the screen locking interface is set as a target control, the unlocking instruction triggered by the user by sliding the control on the touchscreen may be an unlocking instruction triggered by the user by sliding the unlocking button to the target control on the touchscreen, or may be an unlocking instruction triggered by the user by sliding the target control to the unlocking button on the touchscreen. Then, the unlocking operation unit 203 performs an unlocking operation on the touchscreen according to the corresponding user-defined screen locking configuration file.

After the instruction receiving unit 201 of the touchscreen apparatus receives the unlocking instruction triggered by the user, the file reading unit 202 reads the corresponding user-defined screen locking configuration file.

When the unlocking operation unit 203 performs an unlocking operation on the touchscreen, by using the screen locking interface shown in FIG. 2 as an example, when the user sliding manner is sliding from the unlocking button to the target control, the unlocking operation unit 203 first determines whether the unlocking button moves to an area in which the target control is located. If the unlocking button does not move to the area in which the target control is located, the unlocking operation unit 203 indicates that the unlocking fails, and plays an animation and/or a sound corresponding to an unlocking failure. If the unlocking button moves to the area in which the target control is located, the unlocking operation unit 203 indicates that the unlocking succeeds, displays a corresponding unlocking interface or enters a corresponding application interface according to an unlocking manner in the screen locking configuration file corresponding to the target control. At the same time, the unlocking operation unit 203 plays a corresponding animation and sound or generates a vibration, where all or some unlocking effects of the animation, the sound, and the vibration may be configured.

Alternatively, when the user sliding manner is sliding from the target control to the unlocking button, the unlocking operation unit 203 first determines whether the target control moves to a target area in which the unlocking button is located. If the target control docs not move to the target area in which the unlocking button is located, the unlocking operation unit 203 indicates that the unlocking fails, and plays an animation and/or a sound corresponding to an unlocking failure. If the target control moves to the target area in which the unlocking button is located, the unlocking operation unit 203 indicates that the unlocking succeeds, displays a corresponding unlocking interface or enters a corresponding application interface according to an unlocking manner in the screen locking configuration file corresponding to the target control. At the same time, the unlocking operation unit 203 plays a corresponding animation and sound or generates a vibration.

In this embodiment, the foregoing solution enables a user to self-define a screen locking interface and a corresponding control unlocking manner according to a requirement, and a control may display different effects such as an animation, a sound, and a vibration in different states, thereby greatly improving unlocking convenience and fun, and meeting the requirement that the user hopes to self-define an unlocking manner according to the preference of the user.

Figure 5:
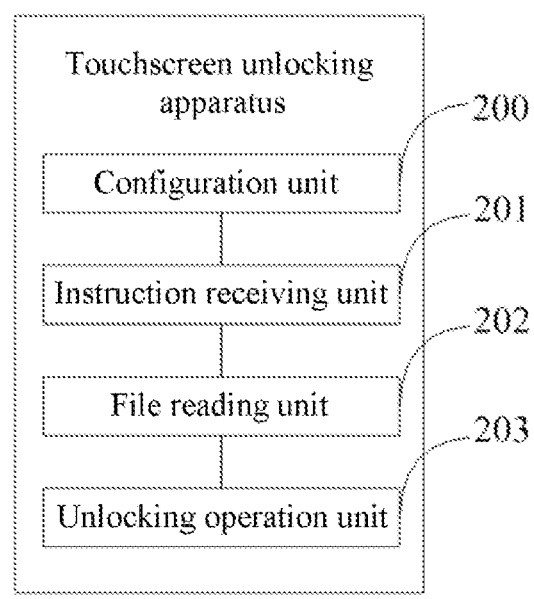
FIG. 5 illustrates a schematic structural diagram of a second embodiment of a touchscreen unlocking apparatus according to the present disclosure.

As shown in FIG. 5, on the basis of the above embodiment, a structure of a second embodiment of a touchscreen unlocking apparatus of the present disclosure further includes a configuration unit 200, which is configured to receive a user input instruction, to configure the corresponding user-defined screen locking configuration file, and to display a user-defined screen locking interface on a touchscreen desktop.

A difference between this embodiment and the first embodiment may be that, this embodiment further includes a solution in which the user self-defines and configures the screen locking configuration file and a touchscreen apparatus displays the user-defined screen locking interface on the touchscreen desktop.

Specifically, the touchscreen apparatus may provide a setting option for the user to select for input, and to self-define icons of touchable controls that the user hopes to be displayed on a desktop of the touchscreen apparatus, including a control for unlocking, thereby forming a user-defined screen locking desktop.

The user may self-define any icon display on the touchscreen desktop, where content of each icon display is treated as a single control, and the touchscreen apparatus displays a corresponding screen locking interface on a touchscreen desktop according to user settings. As shown in FIG. 2, FIG. 2 is a user-defined screen locking interface of a touchscreen on a mobile phone QQ desktop, which includes the following controls: unlocking target controls such as a time and date display, a charging display, an unlocking button, a main menu, a call, a camera, and WeChat. In an actual screen locking interface, the controls are not limited to the foregoing several controls.

In addition, the user may further self-define a specific unlocking manner based on the controls on the screen locking interface. The setting information such as the user-defined setting made by the user for the screen locking interface and a corresponding unlocking manner are stored in the touchscreen apparatus as a screen locking configuration file, and subsequently corresponding unlocking operation may be performed according to the screen locking configuration file.

In this embodiment, a user-defined configuration of a screen locking configuration file can be implemented on a touchscreen apparatus. On a touchscreen desktop, there may be any number of touchable controls and any number of unlocking area controls, thereby greatly improving unlocking convenience and fun.

The touchable control docs not have to be used as an unlocking control, and may be simply used for entertainment (when the control is taped, a sound is generated, an animation is played, or the like), or for improving look of an interface (for example, tapping a time to switch to a date, or tapping an icon to display a time; however, the time and date are not displayed in a normal state so as to prevent impacting on the entire look of the interface).

In addition, any control may have effects such as an animation, a sound, and a vibration, and may display different effects in different states. In this embodiment, the unlocking effects of the control may be further compatible with most conventional unlocking effects, and the user may freely transplant a needed unlocking effect. In addition, an extended parameter may help the user create some "cool and dazzling" special effects. According to an embodiment of the present invention, the units 200, 201, 202, and 203 in the touchscreen unlocking apparatus that is shown in FIG. 4 and FIG. 5 may be separate units or all combined into one unit to implement the same functions, or a unit (or some units) thereof may further be divided into multiple functionally smaller units to implement the same functions, without affecting technical effects of embodiments of the present disclosure.

According to another embodiment of the present disclosure, a computer program (including program code) that can execute the touchscreen unlocking method shown in FIG. 1 and FIG. 3 runs on a computing device, such as a computer, including a processing element and a storage element such as a central processing unit (CPU), a random access memory (RAM), and a read-only memory (ROM), so as to construct the touchscreen unlocking apparatus shown in FIG. 4 and/or FIG. 5, and implement the touchscreen unlocking method according to the embodiments of the present invention. The computer program may be recorded, for example, in a computer readable storage medium and installed in the computing device by using the computer readable storage medium, and run in the computing device.

The foregoing descriptions are merely preferred embodiments of the present invention but are not intended to limit the patent scope of the present disclosure. Any equivalent modifications made to the structures or processes based on the content of the specification and the accompanying drawings of the present disclosure for direct or indirect use in other relevant technical fields shall also be encompassed in the patent protection scope of the present disclosure.

What is claimed is:

1. A touchscreen unlocking method, comprising:
   displaying, by a terminal including at least a processor and a touchscreen, a screen locking interface containing multiple controls according to a screen locking configuration file, the multiple controls corresponding to different functions or applications of the terminal;
   maintaining, in the screen locking configuration file, a current state for each of the multiple controls based on touchscreen input, wherein the current state for each of the multiple controls is a non-trigger state, a press state, an unlock success state, or an unlock fail state, and a plurality of icons of the multiple controls displayed on the screen locking interface are defined by a user;
   receiving, by the terminal, an unlocking instruction triggered by the user by sliding a first control on the touchscreen, the first control being one of the multiple controls, wherein attribute information of the first control prestored in the screen locking configuration file includes multiple target areas corresponding to a unlocking function of the first control, each target area being a specific coordinate area on the screen locking interface or an area corresponding to a second control;
   determining the current state of the first control as the unlock success state and setting all of the multiple controls to the unlock success state when, according to the unlocking instruction, the first control is moved and released in any one of the multiple target areas on the screen locking interface; and
   performing an unlocking operation on the touchscreen to unlock the touchscreen according to the determined current state of the first control and the screen locking configuration file.

2. The method according to claim 1, wherein an unlocking button is set on the touchscreen, and receiving the unlocking further comprises:
   receiving an unlocking instruction triggered by the user by sliding the unlocking button to a target control on the touchscreen, the first control being the unlocking button and the target area being an area corresponding to the target control; or receiving an unlocking instruction triggered by the user by sliding a target control to the unlocking button on the touchscreen, the first control being the target control and the target are being an area corresponding to the unlocking button,
   wherein: the first control is moved on the screen locking interface along with the sliding unlocking instruction; and the unlock success state is determined when the first control is released in the target area.

3. The method according to claim 1, wherein the screen locking configuration file comprises, for each of the multiple controls, a type of the control, and attribute information of the control, wherein:
   the attribute information of the control comprises: coordinates of the control on the screen, and a touchable area of the control for identifying an area on the touch screen responsive to the control, wherein the current state of the control is determined to be the press state when a touching instruction in the touchable area is detected;

the type of the control is one of: a first type used for unlocking, and a second type irrelevant to unlocking, wherein the multiple controls include one or more first type control and one or more second type control; and if the control is the first type, the attribute information of the control further includes the multiple target areas which the control being released for determining the unlock success state.

4. The method according to claim 1, wherein the multiple controls displayed on the screen locking interface include the unlocking button and the plurality of icons corresponding to at least one of a main menu, a call, a camera, an instant messaging application, a time-and-data display, and a charging display.

5. The method according to claim 1, further comprising:
writing a description under the first control to specify a desktop program that is to be started by default after the first control is determined in the unlock success state.

6. The method according to claim 1, further comprising:
defining a plurality of icons displayed on the touchscreen; and
corresponding the plurality of icons to the multiple controls, wherein each icon corresponds to a single control.

7. The method according to claim 2, wherein performing the unlocking operation further comprises:
in response to determining the unlock success state, displaying a corresponding unlocking interface or entering a corresponding application interface in an unlocking manner in the screen locking configuration file corresponding to the target control.

8. The method according to claim 3, wherein:
the screen locking configuration file further comprises, for each of the multiple controls, an unlocking manner of the control;
if the control is the first type, the unlocking manner of the control includes displaying a corresponding unlocking interface or entering a corresponding application; and the method further comprises:
when the unlock success state is determined, according to the unlocking manner of the first control described in the screen locking configuration file, when the corresponding unlocking interface is displayed or the corresponding application interface is entered, performing at least one of playing a corresponding animation or sound, or generating a vibration; and
when the unlock fail state is determined, playing at least one of an animation or a sound corresponding to an unlocking failure, wherein the unlock fail state is determined when the first control is moved based on the sliding and not released in the target area.

9. The method according to claim 3, wherein before receiving the unlocking instruction triggered by the user by sliding a control on a touchscreen, the method further comprises:
receiving a user input instruction for configuring the screen locking configuration file, wherein the user input instruction includes:
selecting, from a plurality of candidate controls, the multiple controls to be placed and presented on the screen locking interface; and
identifying the type and the attribute information for one of the multiple controls.

10. The method according to claim 6, wherein sliding the first control on the touchscreen, comprises:
moving a first icon corresponding to the first control on the touchscreen.

11. A touchscreen unlocking apparatus, comprising a touchscreen, and at least one processor configured to:
display a screen locking interface containing multiple controls according to a screen locking configuration file, the multiple controls corresponding to different functions or applications of the terminal;
maintain, in the screen locking configuration file, a current state for each of the multiple controls based on touchscreen input, wherein the current state for each of the multiple controls is a non-trigger state, a press state, an unlock success state, or an unlock fail state, and a plurality of icons of the multiple controls displayed on the screen locking interface are defined by a user;
receive an unlocking instruction triggered by the user by sliding a first control on the touchscreen, the first control being one of the multiple controls, wherein attribute information of the first control prestored in the screen locking configuration file includes multiple target areas corresponding to a unlocking function of the first control, each target area being a specific coordinate area on the screen locking interface or an area corresponding to a second control;
determine the current state of the first control as the unlock success state and setting all of the multiple controls to the unlock success state when, according to the unlocking instruction, the first control is moved and released in any one of the multiple target areas on the screen locking interface; and
perform an unlocking operation on the touchscreen to unlock the touchscreen according to the determined current state of the first control and the screen locking configuration file.

12. The apparatus according to claim 11, wherein an unlocking button is set on the touchscreen, and the at least one processor is further configured to:
receive an unlocking instruction triggered by the user by sliding the unlocking button to a target control on the touchscreen, the first control being the unlocking button and the target area being an area corresponding to the target control; or receive an unlocking instruction triggered by the user by sliding a target control to the unlocking button on the touchscreen, the first control being the target control and the target are being an area corresponding to the unlocking button,
wherein: the first control is moved on the screen locking interface along with the sliding unlocking instruction; and the unlock success state is determined when the first control is released in the target area.

13. The apparatus according to claim 11, wherein the screen locking configuration file comprises, for each of the multiple controls, a type of the control, and attribute information of the control, wherein:
the attribute information of the control comprises: coordinates of the control on the screen, and a touchable area of the control for identifying an area on the touch screen responsive to the control, wherein the current state of the control is determined to be the press state when a touching instruction in the touchable area is detected;
the type of the control is one of: a first type used for unlocking, and a second type irrelevant to unlocking, wherein the multiple controls include one or more first type control and one or more second type control; and if the control is the first type, the attribute information of the control further includes the multiple target areas which the control being released for determining the unlock success state.

14. The apparatus according to claim 12, wherein performing the unlocking operation further comprises:
in response to determining the unlock success state, displaying a corresponding unlocking interface or entering a corresponding application interface in an unlocking manner in the screen locking configuration file corresponding to the target control.

15. The apparatus according to claim 13, wherein:
the screen locking configuration file further comprises, for each of the multiple controls, an unlocking manner of the control;
if the control is the first type, the unlocking manner of the control includes displaying a corresponding unlocking interface or entering a corresponding application; and
the at least one processor is further configured to:
when the unlock success state is determined, according to the unlocking manner of the first control described in the screen locking configuration file, when the corresponding unlocking interface is displayed or the corresponding application interface is entered, perform at least one of playing a corresponding animation or sound, or generating a vibration; and
when the unlock fail state is determined, play at least one of an animation or a sound corresponding to an unlocking failure, wherein the unlock fail state is determined when the first control is moved based on the sliding and not released in the target area.

16. The apparatus according to claim 13, wherein before receiving the unlocking instruction triggered by the user by sliding a control on a touchscreen, the at least one processor is further configured to:
receive a user input instruction for configuring the screen locking configuration file, wherein the user input instruction includes:
select, from a plurality of candidate controls, the multiple controls to be placed and presented on the screen locking interface; and
identify the type and the attribute information for one of the multiple controls.

17. A non-transitory computer-readable medium having computer program for, when being executed by a processor, performing a touchscreen unlocking method, the method comprising:
displaying, by a terminal including at least a processor and a touchscreen, a screen locking interface containing multiple controls according to a screen locking configuration file, the multiple controls corresponding to different functions or applications of the terminal;
maintaining, in the screen locking configuration file, a current state for each of the multiple controls based on touchscreen input, wherein the current state for each of the multiple controls is a non-trigger state, a press state, an unlock success state, or an unlock fail state, and a plurality of icons of the multiple controls displayed on the screen locking interface are defined by a user;
receiving, by the terminal, an unlocking instruction triggered by the user by sliding a first control on the touchscreen, the first control being one of the multiple controls, wherein attribute information of the first control prestored in the screen locking configuration file includes multiple target areas corresponding to a unlocking function of the first control, each target area being a specific coordinate area on the screen locking interface or an area corresponding to a second control;
determining the current state of the first control as the unlock success state and setting all of the multiple controls to the unlock success state when, according to the unlocking instruction, the first control is moved and released in any one of the multiple target areas on the screen locking interface; and
performing an unlocking operation on the touchscreen to unlock the touchscreen according to the determined current state of the first control and the screen locking configuration file.

18. The non-transitory computer-readable medium according to claim 17, wherein an unlocking button is set on the touchscreen, and receiving the unlocking further comprises:
receiving an unlocking instruction triggered by the user by sliding the unlocking button to a target control on the touchscreen, the first control being the unlocking button and the target area being an area corresponding to the target control; or receiving an unlocking instruction triggered by the user by sliding a target control to the unlocking button on the touchscreen, the first control being the target control and the target are being an area corresponding to the unlocking button,
wherein: the first control is moved on the screen locking interface along with the sliding unlocking instruction; and the unlock success state is determined when the first control is released in the target area.

19. The non-transitory computer-readable medium according to claim 17, wherein the screen locking configuration file comprises, for each of the multiple controls, a type of the control, and attribute information of the control, wherein:
the attribute information of the control comprises: coordinates of the control on the screen, and a touchable area of the control for identifying an area on the touch screen responsive to the control, wherein the current state of the control is determined to be the press state when a touching instruction in the touchable area is detected;
the type of the control is one of: a first type used for unlocking, and a second type irrelevant to unlocking, wherein the multiple controls include one or more first type control and one or more second type control; and
if the control is the first type, the attribute information of the control further includes the multiple target areas which the control being released for determining the unlock success state.

20. The non-transitory computer-readable medium according to claim 18, wherein performing the unlocking operation further comprises:
in response to determining the unlock success state, displaying a corresponding unlocking interface or entering a corresponding application interface in an unlocking manner in the screen locking configuration file corresponding to the target control.

* * * * *